(12) United States Patent
Bradbury et al.

(10) Patent No.: US 11,604,956 B2
(45) Date of Patent: Mar. 14, 2023

(54) SEQUENCE-TO-SEQUENCE PREDICTION USING A NEURAL NETWORK MODEL

(71) Applicant: salesforce.com, inc., San Francisco, CA (US)

(72) Inventors: James Edward Khan Bradbury, San Francisco, CA (US); Jiatao Gu, Hong Kong (CN)

(73) Assignee: salesforce.com, inc., San Francisco, CA (US)

(*) Notice: Subject to any disclaimer, the term of this patent is extended or adjusted under 35 U.S.C. 154(b) by 1445 days.

(21) Appl. No.: 15/885,576

(22) Filed: Jan. 31, 2018

(65) Prior Publication Data

US 2019/0130249 A1    May 2, 2019

Related U.S. Application Data

(60) Provisional application No. 62/578,375, filed on Oct. 27, 2017.

(51) Int. Cl.
*G06N 3/04* (2006.01)
*G06F 40/44* (2020.01)
(Continued)

(52) U.S. Cl.
CPC ............. *G06N 3/04* (2013.01); *G06F 40/216* (2020.01); *G06F 40/44* (2020.01); *G06F 40/51* (2020.01); *G06F 40/56* (2020.01); *G06N 3/0454* (2013.01); *G06N 3/0472* (2013.01); *G06N 3/08* (2013.01); *G06N 3/084* (2013.01)

(58) Field of Classification Search
CPC ...... G06N 3/04; G06N 3/0454; G06N 3/0472; G06N 3/08; G06N 3/084; G06F 40/56; G06F 40/51; G06F 40/216; G06F 40/44
See application file for complete search history.

(56) References Cited

U.S. PATENT DOCUMENTS 10,282,663 B2   5/2019   Socher et al.
10,346,721 B2   7/2019   Albright et al.
(Continued)

OTHER PUBLICATIONS

Gu, J., et al, Non-Autoregressive Neural Machine Translation, [retrieved Apr. 20, 2022]. Retrieved from Internet:< https://arxiv.org/abs/1711.02281> (Year: 2017).*
(Continued)

*Primary Examiner* — Miranda M Huang
*Assistant Examiner* — Bart I Rylander
(74) *Attorney, Agent, or Firm* — Haynes and Boone LLP

(57) ABSTRACT

A method for sequence-to-sequence prediction using a neural network model includes A method for sequence-to-sequence prediction using a neural network model, generating an encoded representation based on an input sequence using an encoder of the neural network model, predicting a fertility sequence based on the input sequence, generating an output template based on the input sequence and the fertility sequence, and predicting an output sequence based on the encoded representation and the output template using a decoder of the neural network model. The neural network model includes a plurality of model parameters learned according to a machine learning process. Each item of the fertility sequence includes a fertility count associated with a corresponding item of the input sequence.

18 Claims, 10 Drawing Sheets

(51) Int. Cl.
| | |
|---|---|
| G06N 3/084 | (2023.01) |
| G06F 40/51 | (2020.01) |
| G06F 40/56 | (2020.01) |
| G06F 40/216 | (2020.01) |
| G06N 3/08 | (2023.01) |

(56) References Cited

U.S. PATENT DOCUMENTS

| | | |
|---|---|---|
| 2016/0350653 A1 | 12/2016 | Socher et al. |
| 2017/0024645 A1 | 1/2017 | Socher et al. |
| 2017/0032280 A1 | 2/2017 | Socher et al. |
| 2017/0140240 A1 | 5/2017 | Socher et al. |
| 2018/0082171 A1 | 3/2018 | Merity et al. |
| 2018/0096219 A1 | 4/2018 | Socher |
| 2018/0096267 A1 | 4/2018 | Masekera |
| 2018/0121787 A1 | 5/2018 | Hashimoto et al. |
| 2018/0121788 A1 | 5/2018 | Hashimoto et al. |
| 2018/0121799 A1 | 5/2018 | Hashimoto et al. |
| 2018/0129931 A1 | 5/2018 | Bradbury et al. |
| 2018/0129937 A1 | 5/2018 | Bradbury et al. |
| 2018/0129938 A1 | 5/2018 | Xiong et al. |
| 2018/0143966 A1 | 5/2018 | Lu et al. |
| 2018/0144208 A1 | 5/2018 | Lu et al. |
| 2018/0144248 A1 | 5/2018 | Lu et al. |
| 2018/0268287 A1 | 9/2018 | Johansen et al. |
| 2018/0268298 A1 | 9/2018 | Johansen et al. |
| 2018/0300400 A1 | 10/2018 | Paulus |
| 2019/0108432 A1 | 4/2019 | Lu et al. |
| 2019/0108439 A1 | 4/2019 | Lu et al. |
| 2019/0130206 A1 | 5/2019 | Trott et al. |
| 2019/0130248 A1 | 5/2019 | Zhong et al. |
| 2019/0130273 A1 | 5/2019 | Keskar et al. |
| 2019/0130896 A1 | 5/2019 | Zhou et al. |
| 2019/0130897 A1 | 5/2019 | Zhou et al. |
| 2019/0149834 A1 | 5/2019 | Zhou et al. |

OTHER PUBLICATIONS

Vaswani, A., et al, Attention Is All You Need, [retrieved Apr. 5, 2022]. Retrieved from Internet:<https://proceedings.neurips.cc/paper/2017/hash/3f5ee243547dee91fbd053c1c4a845aa-Abstract.html> (Year: 2017).*

Cohn, T., et al, Incorporating Structural Alignment Biases into an Attentional Neural Translation Model, [retrieved Apr. 5, 2022]. Retrieved from Internet:<https://arxiv.org/abs/1601.01085> (Year: 2016).*

Dimitry Bahdanau, Kyunghyun Cho, and Yoshua Bengio. Neural machine translation by jointly learning to align and translate. In *ICLR*. 2015.

Peter Brown, Vincent della Pietra, Stephen della Pietra, and Robert Mercer. Attention is All You Need ematics of statistical machine translation: Parameter estimation. *Computational Linguistics*. 19(2):263-311.1993.

Kyunghyun Cho. Noisy parallel approximate decoding for conditional recurrent language model. *arXiv preprint arXiv*: 1605.03835. 2016.

Chris Dyer, Victor Chahuneau. and Noah Smith. A simple, fast, and effective reparameterization of IBM Model 2. in *NAACL*. 2013.

Jonas Gehring. Michael Auli. David Grangier. Denis Yarats. and Yann Dauphin. Convolutional sequence to sequence learning. *arXiv preprint arXiv*: 1705.03122, 2017.

Lukasz Kaiser. Aidan Gomez. and Francois Chollet. Depthwise separable convolutions for neural machine translation. *arXiv preprint arXiv*:1706.03059. 2017.

Nal Kalchbrenner, Lasse Espeholt, Karen Simonyan. Aaron van den Oord, Alex Graves, and Koray Kavukcuoglu. Neural machine translation in linear time. *arXiv preprint arXiv*:1610.10099. 2016.

Yoon Kim and Alexander Rush. Sequence-level knowledge distillation. In *EMNLP*, 2016.

Philipp Koehn and Rebecca Knowles. Six challenges for neural machine translation. *arXiv preprint arXivA*:1706.03872. 2017.

Minh-Thang Luong, Hieu Pham, and Christopher D Manning. Effective approaches to attention-based neural machine translation. In *EMNLP*, 2015.

Randi Martin. Jason Crowther, Meredith Knight, Franklin Tamborello, and Chin-Lung Yang. Planning in sentence production: Evidence for the phrase as a default planning scope. *Cognition*. 116 (2): 177-192, 2010.

Kishore Papineni, Salim Roukos, Todd Ward, and Wei-Jing Zhu. BLEU: A method for automatic evaluation of machine translation. In ACL, pp. 311-318. 2002.

Rico Sennrich, Barry Haddow, and Alexandra Birch. Neural machine translation of rare words with subword units. *arXiv preprint arXiv*: 1508.07909. 2015.

Ilya Sutskever, Oriol Vinyals, and Quoc Le. Sequence to sequence learning with neural networks. In *NIPS*. 2014.

Ashish Vaswani, Noam Shazeer, Niki Parmar, Jakob Uszkoreit. Llion Jones. Aidan Gomez, Lukasz Kaiser, and Illia Poiosukhin. Attention is all you need. *arXiv preprint arXiv*:1706.03762. 2017.

Ronald Williams. Simple statistical gradient-following algorithms for connectionist reinforcement learning. Machine Learning. 8(3-4):229-256.1992.

Y. Wu, M. Schuster, Z. Chen, Q. V. Le. M. Norouzi. W. Macherey, M. Kirkun, Y. Cao, Q. Gao. K. Macherey. J. Klingner. A. Shah, M. Johnson, X. Liu, t., Kaiser, S. Gouws, Y. Kato. T. Kudo, H. Kazawa, K. Stevens, G. Kurian. N. Patil, W. Wang, C. Young. J. Smith, J. Riesa, A. Rudnick, O. Vinyals. G. Corrado, M. Hughes. and J. Dean. Google's neural machine translation system: Bridging the gap between human and machine translation. *arXiv preprint arXiv*: 1609.08144. 2016.

International Search Report and Written Opinion issued by the International Searching Authority dated Mar. 6, 2019 for PCT Application No. PCT/IB2018/001318. pp. 1-23.

Brown et al., "A Statistical Approach to Machine Translation," Published in Computational Linguistics, vol. 16, No. 2. Jan. 1, 1990. Available Online at: https://www.aclweb.org/anthology/J90-2002. pp. 1-7.

Brown et al., "The Mathematics of Statistical Machine Translation: Parameter Estimation," Published in Computational Linguistics, vol. 19, No. 2. Jun. 1, 1993. Available Online at: https://www.aclweb.org/anthology/J93-2003. pp. 1-50.

Cohn et al., "Incorporating Structure Alignment Biases into an Attentional Neural Translation Model," Proceedings of the 2016 Conference of the North American Chapter of the Association for Computational Linguistics: Human Language Technologies. San Diego, CA. Jun. 12-17, 2016. pp. 1-10.

Gu et al., "Non-Autoregressive Neural Machine Translation," Published as a Conference Paper at the International Conference on Learning Representation. Vancouver, Canada. Apr. 30, 2018-May 3, 2018. pp. 1-13.

* cited by examiner

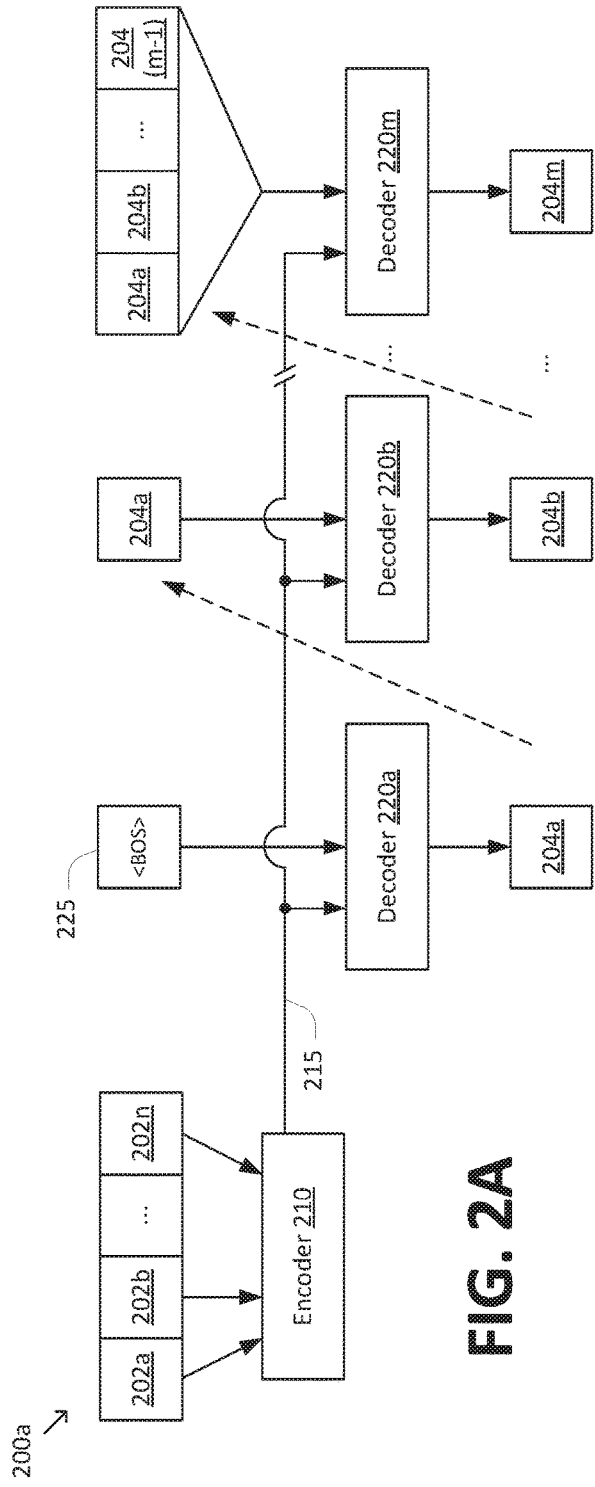
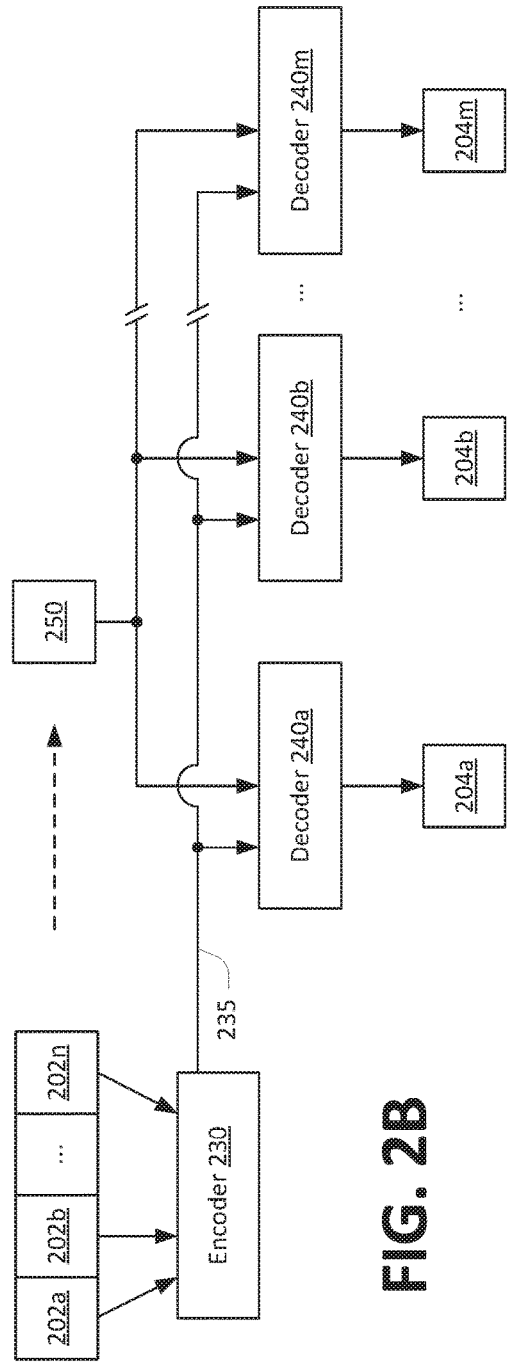

| Models | WMT14 | | WMT16 | | IWSLT16 | | |
|---|---|---|---|---|---|---|---|
| | En→De | De→En | En→Ro | Ro→En | En→De | Latency | Speedup |
| NAT | 17.35 | 20.62 | 26.22 | 27.83 | 25.20 | 39 ms | 15.6× |
| NAT (+FT) | 17.69 | 21.47 | 27.29 | 29.06 | 26.52 | 39 ms | 15.6× |
| NAT (+FT + NPD s = 10) | 18.66 | 22.41 | 29.02 | 30.76 | 27.44 | 79 ms | 7.68× |
| NAT (+FT + NPD s = 100) | 19.17 | 23.20 | 29.79 | 31.44 | 28.16 | 257 ms | 2.36× |
| Autoregressive (b = 1) | 22.71 | 26.39 | 31.35 | 31.03 | 28.89 | 408 ms | 1.49× |
| Autoregressive (b = 4) | 23.45 | 27.02 | 31.91 | 31.76 | 29.70 | 607 ms | 1.00× |

FIG. 8A

| | |
|---|---|
| se lucreaza la solutii de genul acesta . | |
| se la solutii de genul acesta . | solutions on this kind are done . |
| se lucreaza la solutii de acesta . | work done on solutions like this . |
| se lucreaza solutii de genul acesta . | solutions on this kind is done . |
| se se lucreaza la solutii de acesta . | work is done on solutions like this . |
| se lucreaza lucreaza la solutii de acesta . | work is done on solutions like this . |
| se se lucreaza lucreaza la solutii de acesta . | work is being done on solutions like this . |
| se se lucreaza lucreaza la solutii de de acesta . | work is being done on solutions such as this . |
| se se lucreaza lucreaza la solutii de genul acesta . | work is being done on solutions such this kind . |

FIG. 8B

SEQUENCE-TO-SEQUENCE PREDICTION USING A NEURAL NETWORK MODEL

RELATED APPLICATIONS

The present application claims priority to U.S. Provisional Patent Application No. 62/578,375, filed Oct. 27, 2017, entitled "Non-Autoregressive Neural Machine Translation," which is hereby incorporated by reference in its entirety.

TECHNICAL FIELD

Embodiments of the present disclosure relate generally to neural network models and more particularly to neural network models for sequence-to-sequence prediction.

BACKGROUND

Neural networks have demonstrated great promise as a technique for automatically analyzing real-world information with human-like accuracy. In general, neural network models receive input information and make predictions based on the input information. For example, a neural network classifier may predict a class of the input information among a predetermined set of classes. Whereas other approaches to analyzing real-world information may involve hard-coded processes, statistical analysis, and/or the like, neural networks learn to make predictions gradually, by a process of trial and error, using a machine learning process. A given neural network model may be trained using a large number of training examples, proceeding iteratively until the neural network model begins to consistently make similar inferences from the training examples that a human might make. Neural network models have been shown to outperform and/or have the potential to outperform other computing techniques in a number of applications. Indeed, some applications have even been identified in which neural networking models exceed human-level performance.

BRIEF DESCRIPTION OF THE DRAWINGS

These and other aspects and features of the present disclosure will become apparent to those ordinarily skilled in the art upon review of the following description of specific embodiments in conjunction with the accompanying figures, wherein:

FIGS. 2A and 2B are simplified diagrams comparing an autoregressive model for sequence-to-sequence prediction with a non-autoregressive model for sequence-to-sequence prediction.

FIGS. 8A and 8B are simplified diagrams of an experimental evaluation of a non-autoregressive transformer model according to some embodiments.

DETAILED DESCRIPTION

Sequence-to-sequence prediction is one class of problems to which neural networks may be applied. In sequence-to-sequence applications, a neural network model receives an input sequence and attempts to accurately predict an output sequence based on the input sequence. Sequence-to-sequence models have a wide variety of applications, including machine translation, text summarization, and/or the like. To illustrate, suppose an input sequence provided to a machine translation model includes the English text "Let's go for a walk." The ground truth German translation of the input sequence is "Lass uns spazieren gehen." Accordingly, the machine translation model should predict an output sequence that matches the ground truth translation.

The performance of sequence-to-sequence models, such as machine translation models, may be compared or benchmarked by testing different models on a shared dataset, such as, for example, the WMT 2014 English-to-German data set and/or the WMT 2016 Romanian-to-English data set. The accuracy of each model may be measured by evaluating one or more metrics, such as the BLEU score accuracy. State of art machine translation models achieve a BLEU score of less than or equal 22.71 on the WMT 2014 English-to-German data set and 31.03 on the WMT 2016 Romanian-to-French data set. Similarly, the average latency (e.g., the average time to make a prediction) of each model may be measured, e.g., in milliseconds. For example, state of art machine translation models achieve an average latency of 408 milliseconds on the WMT 2014 English-to-German data set. Moreover, the average latency may increase, e.g., to 607 milliseconds, when techniques such as beam search are used to improve the accuracy of the model.

Accordingly, it is desirable to develop machine translation models that achieve lower latency and comparable and/or higher accuracy than current state of art machine translation models. It is also desirable to develop techniques for training machine translation models faster and/or with less training data (e.g., by improving the rate of convergence during training). More generally, it is desirable to develop improved neural network models for sequence-to-sequence prediction. Although some sequence-to-sequence prediction models receive text input sequences, such as the machine translation models described above, it is to be understood that the sequence-to-sequence models may operate on a wide variety of types of input sequences, including but not limited to text sequences, audio sequences, image sequences (e.g., video), and/or the like.

Figure 1:
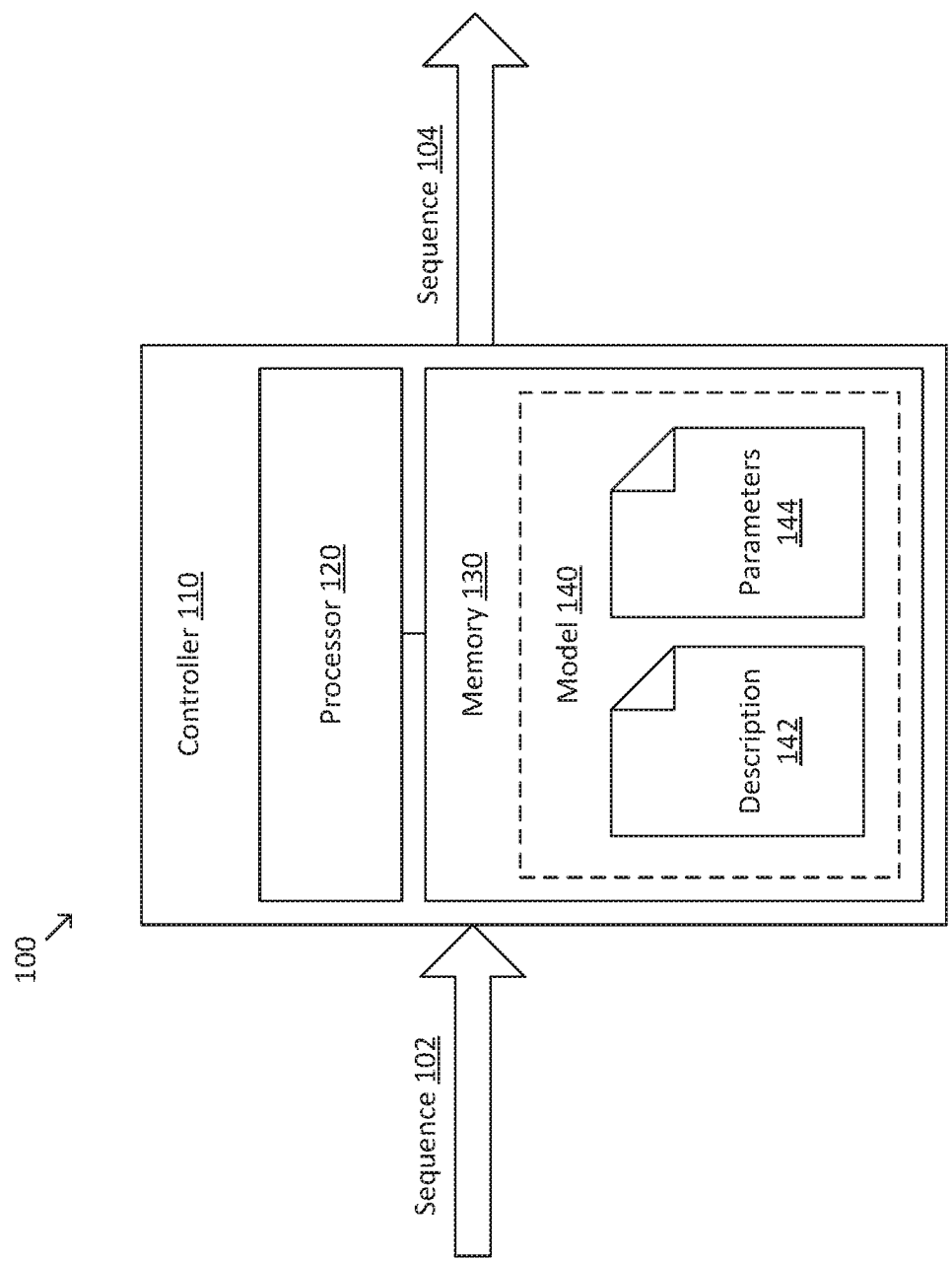
FIG. 1 is a simplified diagram of a system for sequence-to-sequence prediction according to some embodiments.

FIG. 1 is a simplified diagram of a system 100 for sequence-to-sequence prediction according to some embodiments. According to some embodiments, system 100 may receive an input sequence 102 and generate an output sequence 104. For example, in translation applications, input sequence 102 may correspond to a text sequence in a first language, and output sequence 104 may correspond to a text sequence in a second language. Similarly, in text summarization applications, input sequence 102 may correspond to a text sequence representing a document, and output sequence 104 may correspond to a text sequence representing a summary of the document. It is to be understood that these are merely examples, and that system 100 may be used in a wide variety of types of sequence-to-sequence prediction.

As depicted in FIG. 1, system 100 includes a controller 110. In some embodiments, controller 110 may include a processor 120 (e.g., one or more hardware processors). Although processor 120 may include one or more general purpose central processing units (CPUs), processor 120 may additionally or alternately include at least one processor that provides accelerated performance when evaluating neural network models. For example, processor 120 may include a graphics processing unit (GPU), an application specific integrated circuit (ASIC), a field programmable gate array (FPGA), a tensor processing unit (TPU), a digital signal processor (DSP), a single-instruction multiple-data (SIMD) processor, and/or the like. Generally, such processors may accelerate various computing tasks associated with evaluating neural network models (e.g., training, prediction, preprocessing, and/or the like) by an order of magnitude or more in comparison to a general purpose CPU.

Controller 110 may further include a memory 130 (e.g., one or more non-transitory memories). Memory 130 may include various types of short-term and/or long-term storage modules including cache memory, static random access memory (SRAM), dynamic random access memory (DRAM), non-volatile memory (NVM), flash memory, solid state drives (SSD), hard disk drives (HDD), optical storage media, magnetic tape, and/or the like. In some embodiments, memory 130 may store instructions that are executable by processor 120 to cause processor 120 to perform operations corresponding to processes disclosed herein and described in more detail below.

Processor 120 and/or memory 130 may be arranged in any suitable physical arrangement. In some embodiments, processor 120 and/or memory 130 may be implemented on a same board, in a same package (e.g., system-in-package), on a same chip (e.g., system-on-chip), and/or the like. In some embodiments, processor 120 and/or memory 130 may correspond to distributed, virtualized, and/or containerized computing resources. Consistent with such embodiments, processor 120 and/or memory 130 may be located in one or more data centers and/or cloud computing facilities.

In some embodiments, memory 130 may store a model 140 that is evaluated by processor 120 during sequence-to-sequence prediction. Model 140 may include a plurality of neural network layers. Examples of neural network layers include densely connected layers, convolutional layers, recurrent layers, pooling layers, dropout layers, and/or the like. In some embodiments, model 140 may include at least one hidden layer that is not directly connected to either an input or an output of the neural network. Model 140 may further include a plurality of model parameters (e.g., weights and/or biases) that are learned according to a machine learning process. Examples of machine learning processes include supervised learning, reinforcement learning, unsupervised learning, and/or the like.

Model 140 may be stored in memory 130 using any number of files and/or data structures. As depicted in FIG. 1, model 140 includes a model description file 142 that defines a computational graph of model 140 (e.g., a sequence of neural network layers) and a model parameters file 144 that stores parameters of model 140 (e.g., weights and/or biases). In general, model description file 142 and/or model parameters file 144 may store information associated with model 140 in any suitable format, including but not limited to structured, unstructured, serialized, and/or database formats.

FIGS. 2A and 2B are simplified diagrams comparing an autoregressive model 200a for sequence-to-sequence prediction with a non-autoregressive model 200b for sequence-to-sequence prediction. Models 200a and/or 200b may generally correspond to implementations of model 140. Accordingly, models 200a and/or 200b may receive an input sequence 202 having n items 202a-n and predict an output sequence 204 having m items 204a-m. Input sequence 202 and output sequence 204 generally correspond to input sequence 102 and output sequence 104, respectively.

Autoregressive model 200a includes an encoder 210 that receives input sequence 202 and generates an encoded representation 215. Autoregressive model 200a further includes an autoregressive decoder 220 that performs m decoding steps 220a-m to iteratively generate output sequence 204 based on encoded representation 215. As depicted in FIG. 2A, autoregressive decoder 220 generates output sequence 204 one item at a time until the iterative process terminates. For example, the iterative process may terminate when output sequence 204 reaches a predetermined maximum length and/or when the predicted item during a given iteration corresponds to a special tag marking the end of output sequence 204 (e.g., an end-of-sentence tag "<eos>").

At each of decoding steps 220a-m, autoregressive decoder 220 receives encoded representation 215 and a portion of output sequence 204 generated at previous decoder steps. For example, the second decoder step 220b predicts item 204b based on the output of the first decoder step 220a (i.e., item 204a). Similarly, the last decoder step 220m predicts item 204m based on the output of each previous decoder step 220a-(m−1) (i.e., items 204a-(m−1)). The first decoder step 220a may predict item 204a based on a placeholder item 225, such as a beginning-of-sentence ("<bos>") tag.

As indicated by the dashed line arrows in FIG. 2A, the inputs to each of decoder steps 220b-m depend on the outputs from previous decoder steps 220a-(m−1). Accordingly, the operation of autoregressive decoder 220 is not parallelizable. That is, decoder steps 220a-m are performed in a serial manner, with each of decoder steps 220b-m being performed after the preceding decoder steps 220a-(m−1) have been completed. Consequently, autoregressive model 200a may have limited ability to harness parallel computing resources, thereby limiting the performance (e.g., latency) of autoregressive model 200a.

To address these challenges, non-autoregressive model 200b may be adapted to reduce and/or eliminate the above-identified dependencies among decoder steps. Like autoregressive model 200a, non-autoregressive model 200b may include an encoder 230 that receives input sequence 202 and generates an encoded representation 235. Non-autoregressive model 200b may further include a non-autoregressive decoder 240 that performs m decoding steps 240a-m to generate output sequence 204 based on encoded representation 235.

At each of decoder steps 240a-m, non-autoregressive decoder 240 receives encoded representation 235 and an output template 250. In general, output template 250 may depend on input sequence 202, encoded representation 235, and/or the like (as generally indicated by the dashed line arrow in FIG. 2B), but does not depend on output sequence 204. Embodiments of output template 250 are discussed in greater detail below. Accordingly, unlike autoregressive decoder 220, the operation of non-autoregressive decoder 240 may be parallelizable. That is, by reducing and/or eliminating the dependency between decoder steps 240b-m on previous decoder steps 240a-(m−1), each of decoder steps 240a-m may be performed in parallel (e.g., concurrently and/or without waiting on other decoder steps to complete). In this regard, the performance (e.g., latency) of non-autoregressive model 200b may exceed that of autoregressive model 200a. In particular, non-autoregressive decoder 240 may have a latency that is up to m times lower than autoregressive decoder 220 (assuming decoders 220 and 240 otherwise share similar characteristics), because non-autoregressive decoder 240 may perform the m decoding steps 240*a-m* in parallel, whereas autoregressive decoder 220 performs the m decoding steps 220*a-m* in a serial manner.

Nevertheless, it may be challenging for non-autoregressive model 200*b* to achieve an accuracy that is comparable to that of autoregressive model 200*a*. To illustrate, suppose models 200*a* and 200*b* are being used to translate the French phrase "merci beaucoup" (corresponding to input sequence 202) into the English phrase "thank you very much" (corresponding to output sequence 204). In the case of autoregressive model 200*a*, at the fourth decoder step, the input to autoregressive decoder 220 is the sequence "thank you very ———————," which corresponds to the first three items of output sequence 204 generated during the three previous decoder steps. It is relatively clear, given the context provided by the sequence "thank you very ———————," that the next item in the sequence is the word "much." Indeed, in this illustration, it would be reasonable to infer the next item even without the aid of encoded representation 215 (that is, based on the first three items of output sequence 204 alone, without further information about input sequence 202). Accordingly, one would expect autoregressive model 200*a* to have little difficulty making the correct prediction in this example.

By contrast, in the case of non-autoregressive model 200*b*, later decoder steps 240*b-m* do not have the benefit of the receiving items 204*a-(m–1)* generated at previous decoder steps 240*a-(m–1)*. For example, even if non-autoregressive decoder 240 correctly predicts the sequence "thank you very ———————" at the first three decoder steps, non-autoregressive decoder 240 may still incorrectly predict that the fourth item is "thankful" (perhaps on the rationale that, without being given the first three words in output sequence 204, the English translation of "merci beaucoup" could be "I am very thankful"). The resulting output sequence would be the incorrect (and indeed, nonsensical) translation "thank you very thankful." Such nonsensical outputs would be very unlikely using autoregressive model 200*a*. As this illustration suggests, non-autoregressive decoding presents a significant challenge in machine translation and, more generally, sequence-to-sequence applications.

Accordingly, it would be desirable to develop improved non-autoregressive models, such as non-autoregressive model 200*b*, which achieve accuracy comparable to or better than autoregressive models, such as autoregressive model 200*a*.

Figure 3A:
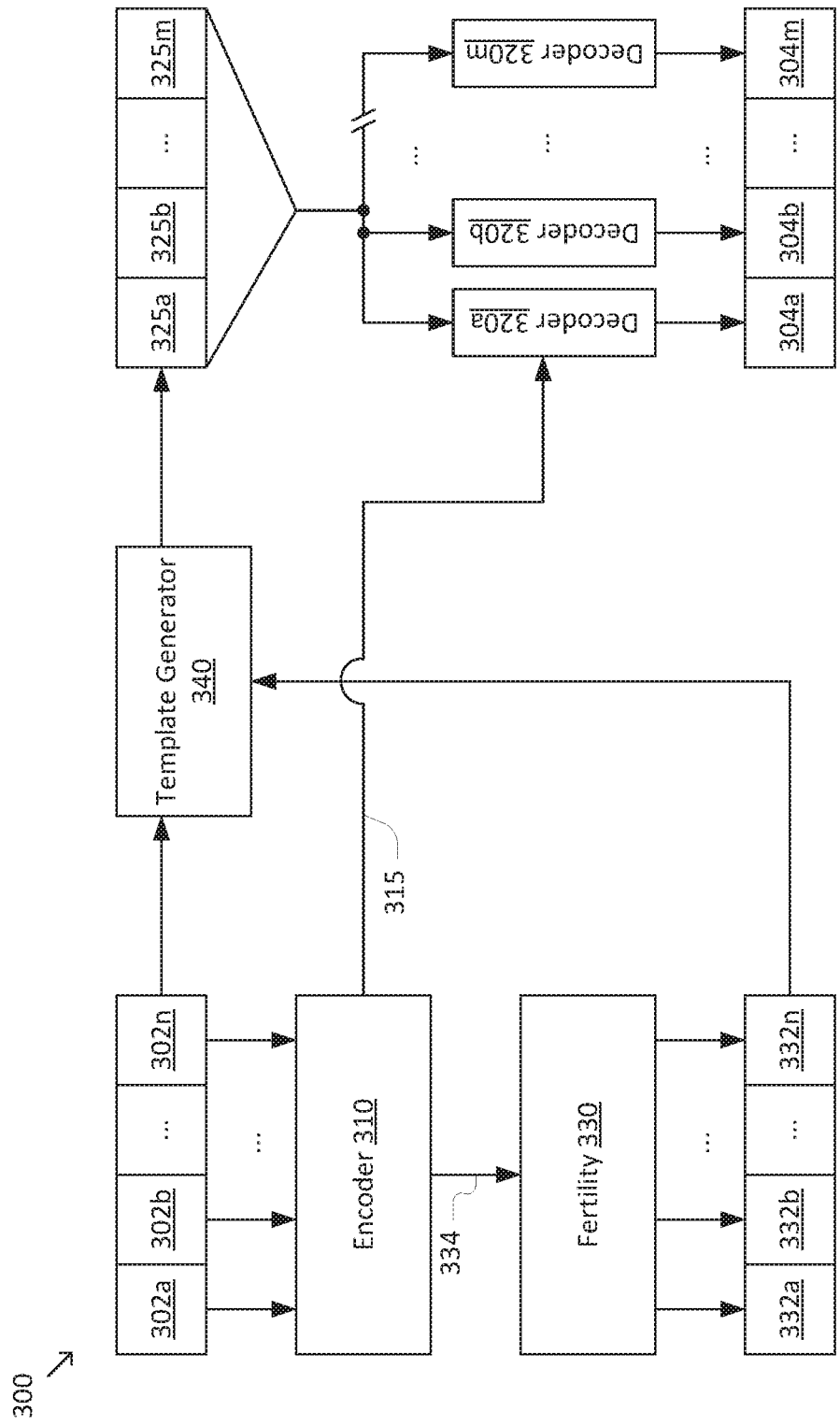
FIGS. 3A-3C are simplified diagrams of a non-autoregressive model for sequence-to-sequence prediction according to some embodiments.
Figure 3B:
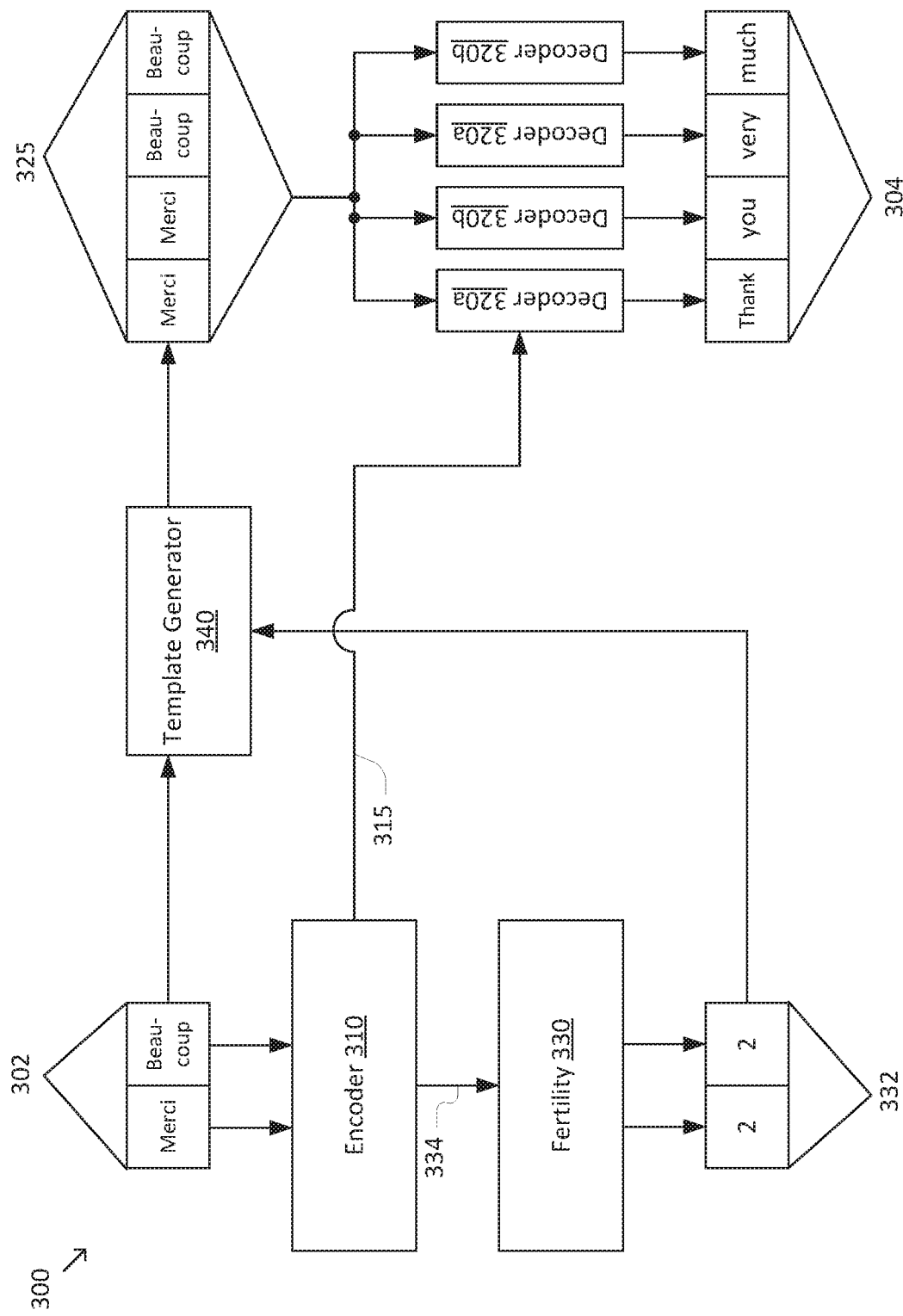
Figure 3C:
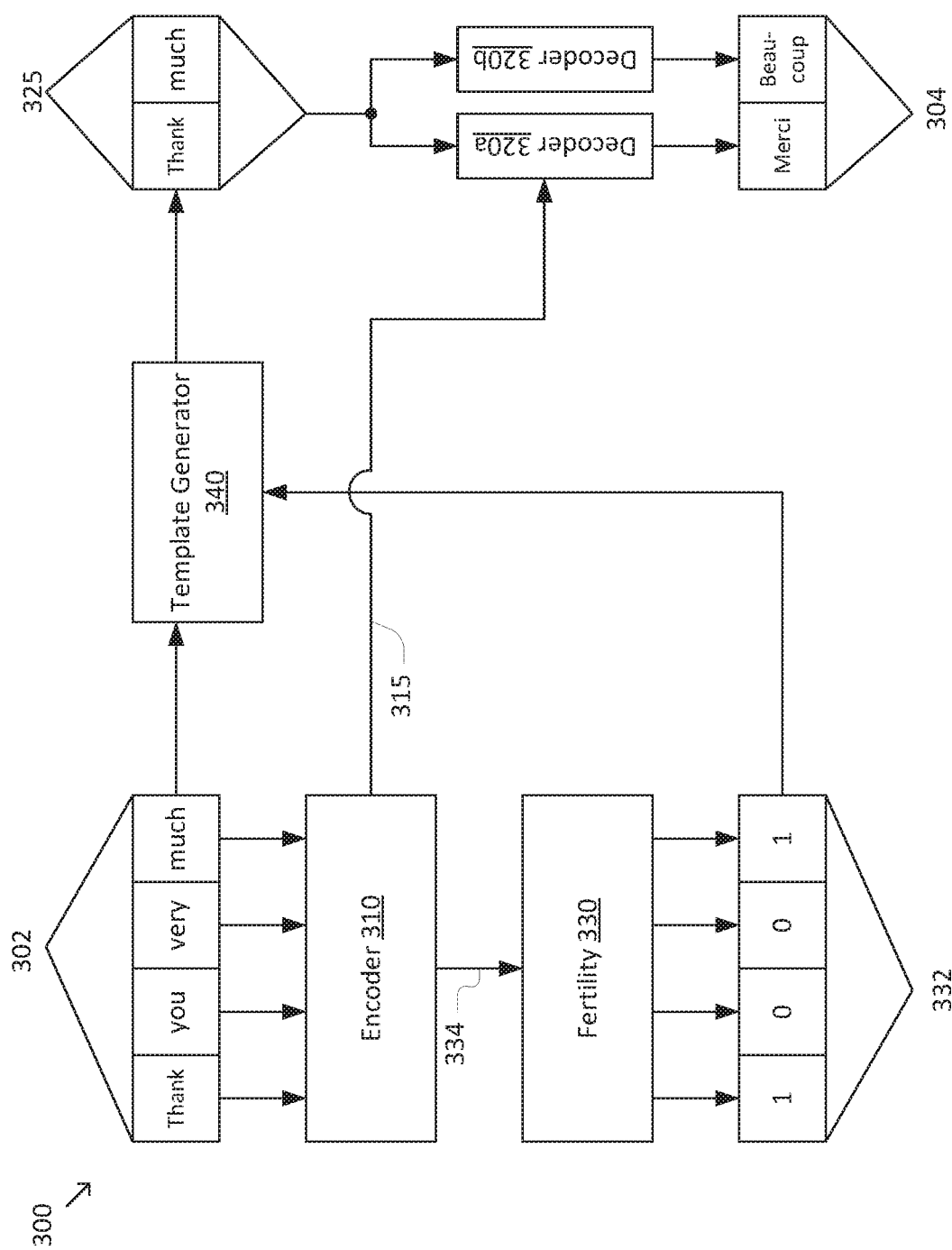

FIGS. 3A-3C are simplified diagrams of a non-autoregressive model 300 for sequence-to-sequence prediction according to some embodiments. According to some embodiments consistent with FIGS. 1-2B, non-autoregressive model 300 may be used to implement model 140 and/or non-autoregressive model 200*b*. Consistent with such embodiments, non-autoregressive model 300 may receive an input sequence 302 having n items 302*a-n* and predict an output sequence 304 having m items 304*a-m*. Input sequence 302 and output sequence 304 generally correspond to input sequences 102 and/or 202 and output sequences 104 and/or 204, respectively.

Non-autoregressive model 300 includes an encoder 310 that receives input sequence 302 and generates an encoded representation 315, which generally correspond to encoder 230 and encoded representation 235, respectively. Non-autoregressive model 300 further includes a non-autoregressive decoder 320 that performs m decoding steps 320*a-m* to generate output sequence 304 based on encoded representation 315 and an output template 325. Non-autoregressive decoder 320 generally corresponds to non-autoregressive decoder 240, and output template 325 generally corresponds to output template 250. As depicted in FIG. 3A, output template 325 includes m items 325*a-m* (i.e., the same number of items as output sequence 304). However, it is to be understood that output template 325 may have a different number of items than output sequence 304 in some embodiments.

To generate output template 325, non-autoregressive model 300 may include a fertility module 330. Fertility module 330 generates a fertility sequence 332 that includes n fertility counts 332*a-n* corresponding to items 302*a-n* of input sequence 302. Each of fertility counts 332*a-n* corresponds to a value (e.g., a non-negative integer) indicating a fertility of each of items 302*a-n*. In general, the fertility of a given item in input sequence 302 corresponds to a number of items in output sequence 304 that may be aligned with the given item. An example of an alignment algorithm that may be used to determine a set of fertilities for a given input and output sequence in machine translation applications is the IBM Model 2, described in "The Mathematics of Statistical Machine Translation: Parameter Estimation," *Computational Linguistics,* 1993, to Brown et al., which is hereby incorporated by reference in its entirety.

According to some embodiments, fertility module 330 may include a neural network classifier that predicts fertility sequence 332 based on a fertility input representation 334. In illustrative examples, fertility module 330 may include a feed-forward neural network having one or more layers, with a softmax classifier as the output layer. As depicted in FIGS. 3A-3C, fertility input representation 334 corresponds to an encoded representation generated by encoder 310 (which may be the same as and/or different from encoded representation 315). However, it is to be understood that various alternative arrangements are possible. For example, fertility input representation 334 may be based directly on input sequence 302, bypassing encoder 310.

In some embodiments, the neural network classifier of fertility module 330 may estimate a probability distribution for each item in input sequence 302, where the probability distribution identifies the probability that a given item in input sequence 302 has a particular fertility count. Based on the probability distribution, fertility sequence 332 may be determined using an argmax approach (e.g., based on the maximum value of the probability distribution). In some examples, fertility sequence 332 may be determined using an average approach (e.g., based on the expectation value of the probability distribution). In some examples, fertility sequence 332 may be determined using a sampled search approach, in which (1) a plurality of candidate fertility sequences are sampled from the probability distribution, (2) a plurality of candidate output sequences are determined based on the candidate fertility sequences, and (3) the best output sequence is selected from the candidate output sequences using a suitable ranking technique (e.g., determining the candidate output sequence with the highest likelihood). Notably, the sampled search approach is parallelizable (e.g., the plurality of candidate fertility sequences may be tested independently of one another), so the sampled search approach may retain the latency-related improvements associated with the parallelizability of non-autoregressive model 300.

Non-autoregressive model 300 may further include a template generator 340 that receives input sequence 302 and fertility sequence 332 and generates output template 325. In some embodiments, template generator 340 may generate output template 325 by appending f copies of a given item in input sequence 302 to output template 325, where f is the fertility count from fertility sequence 332 corresponding to the given item. In some examples, template generator 340 may repeat this operation for each of items 302a-n in input sequence 302.

FIG. 3B depicts an example of non-autoregressive model 300 in a French-to-English machine translation application. As depicted in FIG. 3B, input sequence 302 corresponds to the French phrase "merci beaucoup." The corresponding fertility sequence 332 is [2, 2]. That is, the fertility count corresponding to "merci" is 2, and the fertility count corresponding to "beaucoup" is also 2. Generally, this indicates that two words of output sequence 304 are expected to be aligned with each of the two words of input sequence 302 (resulting in a total of four words in output sequence 304). Based on input sequence 302 and fertility sequence 332, template generator 340 populates output template 325 with the sequence "merci merci beaucoup beaucoup," as template generator 340 repeats each item in input sequence 302 twice in accordance with fertility sequence 332. Non-autoregressive decoder 320 then generates output sequence 304 "thank you very much" based on output template 325. In particular, the first two words of output sequence 304, "thank you," generally correspond to the translation of "merci," which makes up the first two words of output template 325. Likewise, the last two words of output sequence 304, "very much," generally correspond to the translation of "beaucoup," which makes up the last two words of output template 325.

FIG. 3C depicts an example of non-autoregressive model 300 in an English-to-French machine translation application. As depicted in FIG. 3B, input sequence 302 corresponds to the English phrase "thank you very much." The corresponding fertility sequence 332 is [1, 0, 0, 1]. That is, the fertility counts corresponding to "thank" and "much" are 1, the fertility counts corresponding to "you" and "very" are 0. Based on input sequence 302 and fertility sequence 332, template generator 340 populates output template 325 with the sequence "thank much," as template generator 340 does not include items with a fertility count of 0 in output template 325. Non-autoregressive decoder 320 then generates output sequence 304 "merci beaucoup" based on output template 325. In particular, the first word of output sequence 304, "merci," generally corresponds to the translation of "thank," which makes up the first word of output template 325. Likewise, the last word of output sequence 304, "beaucoup," generally corresponds to the translation of "much," which makes up the last word of output template 325.

According to some embodiments, non-autoregressive model 300 may correspond to a computational graph, and various modules (e.g., encoder 310, decoder 320, fertility module 330, etc.) may correspond to collections of nodes in the computational graph. Consistent with such embodiments, various representations used by model 300 (e.g., encoded representation 315, fertility input representation 334, and/or various other intermediate representations of non-autoregressive model 300) may correspond to real-valued tensors, such as scalars, vectors, multidimensional arrays, and/or the like. Moreover, each node of the computation graph may perform one or more tensor operations, e.g., transforming one or more node input representations into one or more node output representations. Examples of tensor operations performed at various nodes may include matrix multiplication, n-dimensional convolution, normalization, element-wise operations, and/or the like.

Figure 4:
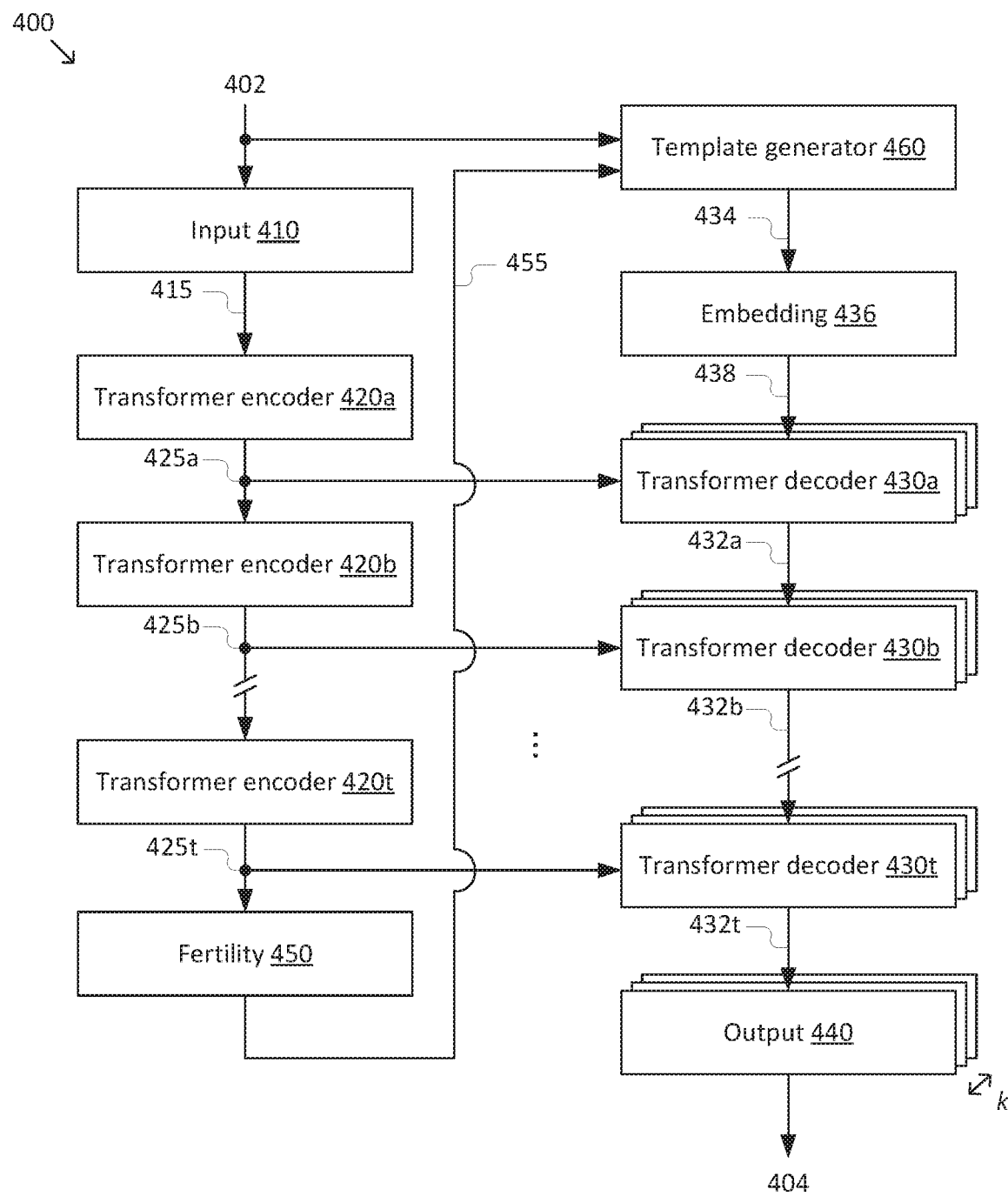
FIG. 4 is a simplified diagram of a non-autoregressive transformer model according to some embodiments.

FIG. 4 is a simplified diagram of a non-autoregressive transformer model 400 according to some embodiments. According to some embodiments consistent with FIGS. 1-3C, non-autoregressive transformer model 400 may be used to implement models 140, 200b and/or 300. Consistent with such embodiments, non-autoregressive transformer model 400 may receive an input sequence 402 and predict an output sequence 404. Input sequence 402 and output sequence 404 generally correspond to input sequences 102, 202, and/or 302 and output sequences 104, 204, and/or 304, respectively. In some embodiments, non-autoregressive transformer model 400 may include at least some features that are similar to the transformer model described in "Attention is All You Need," to Vaswani et. al., arXiv preprint arXiv:1706.03762, submitted Jun. 12, 2017, which is hereby incorporated by reference in its entirety.

Non-autoregressive transformer model may include an input stage 410 that receives input sequence 402 and generates an input representation 415 of input sequence 402. In some embodiments, input representation 415 may correspond to vector representations of input sequence 402. For example, when input sequence 402 corresponds to a text sequence, input stage 410 may generate the corresponding vector representation by (1) tokenizing the text sequence and (2) embedding the tokenized text sequence in a vector space. Tokenizing the text sequence may include identifying tokens within the text sequence, where examples of tokens include characters, character n-grams, words, word n-grams, lemmas, phrases (e.g., noun phrases), sentences, paragraphs, and/or the like. Embedding the tokenized text sequence may include mapping each token to a vector representation in a multidimensional vector space. For example, a token corresponding to a word may be mapped to a 300-dimensional vector representation of the word using the GloVe encodings.

In some embodiments, input stage 410 may perform positional encoding, such that input representation 415 includes positional information (e.g., information pertaining to the ordering of items in input sequence 402). For example, input stage 410 may perform additive encoding. In this regard, non-autoregressive transformer model 400 may retain sensitivity to the ordering of items in input sequence 402 without the use of recurrence (e.g., recurrent neural network layers) in model 400. The ability to limit and/or eliminate recurrence in non-autoregressive transformer model 400 may reduce latency, e.g., by allowing for greater parallelization.

Non-autoregressive transformer model 400 may further include an encoder stage 420 and a decoder stage 430, which generally correspond to encoders 230 and/or 310 and decoders 240 and 320, respectively. Encoder stage 420 includes one or more transformer encoder layers 420a-t arranged sequentially (e.g., in a pipelined manner). Likewise, decoder stage 430 includes a corresponding set of one or more transformer decoder layers 430a-t, also arranged sequentially. Each of transformer encoder layers 420a-t generates a respective layer encoded representation 425a-t that is received by a corresponding decoder layer among transformer decoder layers 430a-t. Collectively, layer encoded representations 425a-t form an encoded representation 425, which generally corresponds to encoded representations 235 and/or 315.

The first transformer encoder layer 420a receives input representation 415 from input stage 410. Each subsequent layer among transformer encoder layers 420b-t receives the layer encoded representations 425a-(t-1)) generated by a preceding layer among transformer encoder layers 420a-(t-

1). Similarly, each of transformer decoder layers 430a-(t–1) generates a respective layer decoded representation 432a-(t–1) that is received by a subsequent layer among decoder layers 430b-t. An output template 434, which generally corresponds to output templates 250 and/or 325, is provided to the first decoder transformer layer 430a via an embedding stage 436. In general, embedding stage 436 may perform similar embedding operations with respect to output template 434 to those of input stage 410 with respect to input sequence 402. For example, when output template 434 includes a sequence of text, embedding stage 436 may map each word (and/or other suitable token) into a word vector space. Likewise, embedding stage 436 may perform positional encoding. Embedding stage 436 generates an embedded representation 438, which is received by the first transformer decoder layer 430a.

Like output template 325, output template 434 is generated based on a fertility model 450. As depicted in FIG. 4, fertility model 450 generates a fertility sequence 455 based on the last layer encoded representation 425t. A template generator 460 receives input sequence 402 and fertility sequence 455 and generates output template 434. According to some embodiments, fertility model 450, fertility sequence 455, and template generator 460 may generally correspond to fertility module 330, fertility sequence 332, and template generator 340, respectively. For example, fertility model 450 may include a neural network classifier that generates a set of non-negative integers corresponding to fertility sequence 455, which is then used by template generator 460 to determine how many copies of each item in input sequence 402 to include in output template 434.

Like non-autoregressive model 300, non-autoregressive transformer model 400 is parallelizable (e.g., each item in output sequence 404 is predicted independently of other items in output sequence 404). Accordingly, as depicted in FIG. 4, non-autoregressive transformer model 400 may include k instances of decoder stage 430 and/or output stage 440 operating in parallel. In general, each of the k instances is responsible for predicting one or more items of output sequence 404. For example, when k is equal to m (the length of output sequence 404), each instance may be responsible for predicting a corresponding item in output sequence 404. In some embodiments, this arrangement may reduce the latency of the decoding operation by up to a factor of k relative to a comparably configured autoregressive model.

In some embodiments, each of transformer encoder layers 420a-t and/or transformer decoder layers 430a-t may be configured in accordance with the transformer model described in Vaswani et al. Consistent with such embodiments, transformer decoder layers 430a-t may include one or more attention networks, which may optionally be masked. In the autoregressive models described in Vaswani et al., a causal mask is applied to prevent earlier decoder steps from accessing information from later decoding steps. The causal mask is applied because, in the case of autoregressive models, later decoding steps depend on earlier decoder steps. However, in the case of non-autoregressive transformer model 400, the decoder steps are independent of one another. Accordingly, transformer decoder layers 430a-t may not use a causal mask. For example, transformer decoder layers 430a-t may be unmasked. Additional or alternately, transformer decoder layers 430a-t may mask one or more query positions to prevent a given output item from attending to itself. That is, at the ith decoder step, the ith position corresponding to the ith item of output sequence 404 may be masked.

Figure 5:
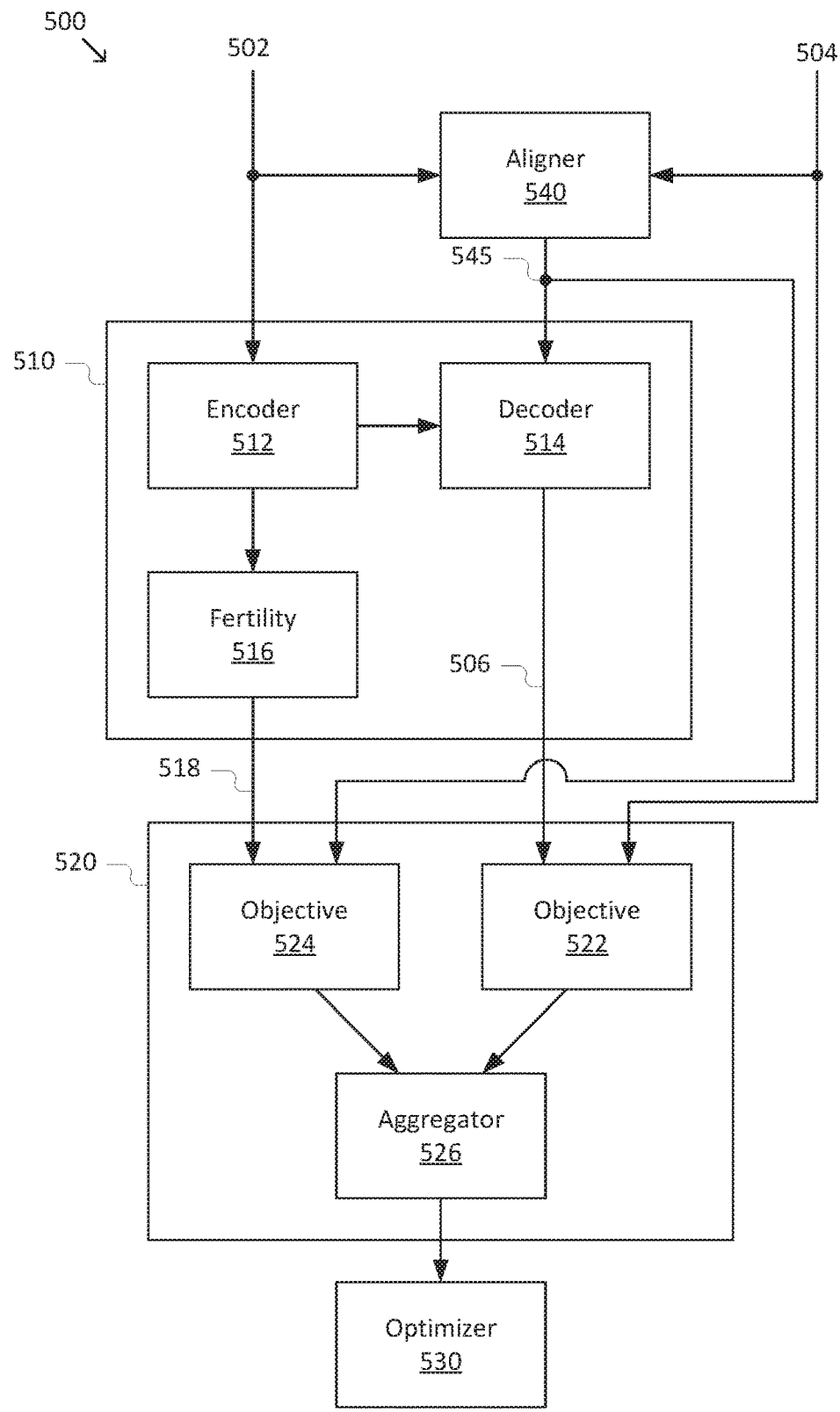
FIG. 5 is a simplified diagram of a training configuration for a neural network model according to some embodiments.

FIG. 5 is a simplified diagram of a training configuration 500 for a neural network model according to some embodiments. As depicted in FIG. 5, training configuration 500 is used to train a non-autoregressive model 510. In some embodiments consistent with FIGS. 1-4, non-autoregressive model 510 may be used to implement models 140, 200b, 300, and/or 400. Consistent with such embodiments, non-autoregressive model 510 may include an encoder 512, a decoder 514, and/or a fertility module 516, which generally correspond to similarly labeled features as described in FIGS. 1-4.

According to some embodiments, training configuration 500 may be used to train a plurality of model parameters of model 510. During training, a large number of training examples are provided to model 510. Each training example includes a training input sequence 502 and a target output sequence 504. For example, in machine translation applications, training input sequence 502 may correspond to a text sequence in a first language, and target output sequence 504 may correspond to the ground truth translation of the text sequence in a second language. Based on training input sequence 502, non-autoregressive model 510 predicts a training output sequence 506. For example, encoder 512 may generate an encoded representation based on training input sequence 502 that is received by decoder 514 and used to predict training output sequence 506.

Training configuration 500 may further include a mixed learning objective 520. As depicted in FIG. 5, mixed learning objective 520 includes an output learning objective 522. Output learning objective 522 compares training output sequence 506 (and/or individual items thereof) with target output sequence 504 (and/or individual items thereof) to determine a loss and/or reward associated with a given prediction. In some embodiments, output learning objective 522 may include a supervised learning objective, a reinforcement learning objective, and/or the like. Mixed learning objective 520 may further include a fertility learning objective 524 and/or an aggregator 526, which are described in further detail below.

The output of mixed learning objective 520 (e.g., the loss and/or reward) is provided to an optimizer 530 to update the model parameters of non-autoregressive model 510. For example, optimizer 530 may determine a gradient of the objective with respect to the model parameters and adjust the model parameters using back propagation. In some embodiments, optimizer 530 may include a gradient descent optimizer (e.g., stochastic gradient descent (SGD) optimizer), an ADAM optimizer, an Adagrad optimizer, an RMSprop optimizer, and/or the like. Various parameters may be supplied to optimizer 530 (e.g., a learning rate, a decay parameter, and/or the like) depending on the type of optimizer used.

Returning to non-autoregressive model 510, fertility module 516 may generate a training fertility sequence 518 based on training input sequence 502 (and/or based on an encoded representation generated by encoder 512). In general, training fertility sequence 518 may correspond to fertility sequences 332 and/or 455. However, providing training fertility sequence 518 as an input to decoder 514 in a manner analogous to fertility sequences 332 and/or 455 may result in a slow rate of convergence (and/or no convergence) during training of model 510. In particular, training fertility sequence 518 is unlikely to be accurate early on in the training of model 510. In turn, providing the inaccurate prediction to decoder 514 during training may slow down the rate of convergence. Moreover, the connection between fertility module 516 and decoder 514 may not be differentiable, making the connection incompatible with some types of training processes, including some particularly efficient training processes, e.g., training processes that use back propagation.

To improve the rate of convergence of non-autoregressive model 510, training configuration 500 may include an aligner 540 that determines a target fertility sequence 545 based on training input sequence 502 and target output sequence 504. In some embodiments, aligner 540 may determine target fertility sequence 545 using an alignment algorithm (e.g., a soft and/or hard alignment algorithm), such as the IBM Model 2 algorithm discussed previously. Target fertility sequence 545 generally corresponds to the ground truth fertility sequence corresponding to a given training input sequence 502 and target output sequence 504. Consistent with such embodiments, target fertility sequence 545, rather than training fertility sequence 518, may be provided as an input to decoder 514. The use of aligner 540 and/or target fertility sequence 545 may increase the rate of convergence of non-autoregressive model 510 by substituting the likely incorrect training fertility sequence 518 with the correct target fertility sequence 545 as the input to decoder 514. Moreover, model 510 may be fully differentiable in training configuration 500, thereby facilitating the use of efficient training techniques such as back propagation.

In order to train fertility module 516, mixed learning objective 520 may include a fertility learning objective 524. As depicted in FIG. 5, fertility learning objective 524 compares training fertility sequence 518 (and/or individual items thereof) with target fertility sequence 545 (and/or individual items thereof) to determine a loss and/or reward associated with a given prediction. In some embodiments, fertility learning objective 524 may include a supervised learning objective, a reinforcement learning objective, and/or the like. Mixed learning objective 520 may further include an aggregator 526 to combine the outputs from output learning objective 522 and fertility learning objective 524 (e.g., by summation, weighted summation, and/or the like).

Figure 6:
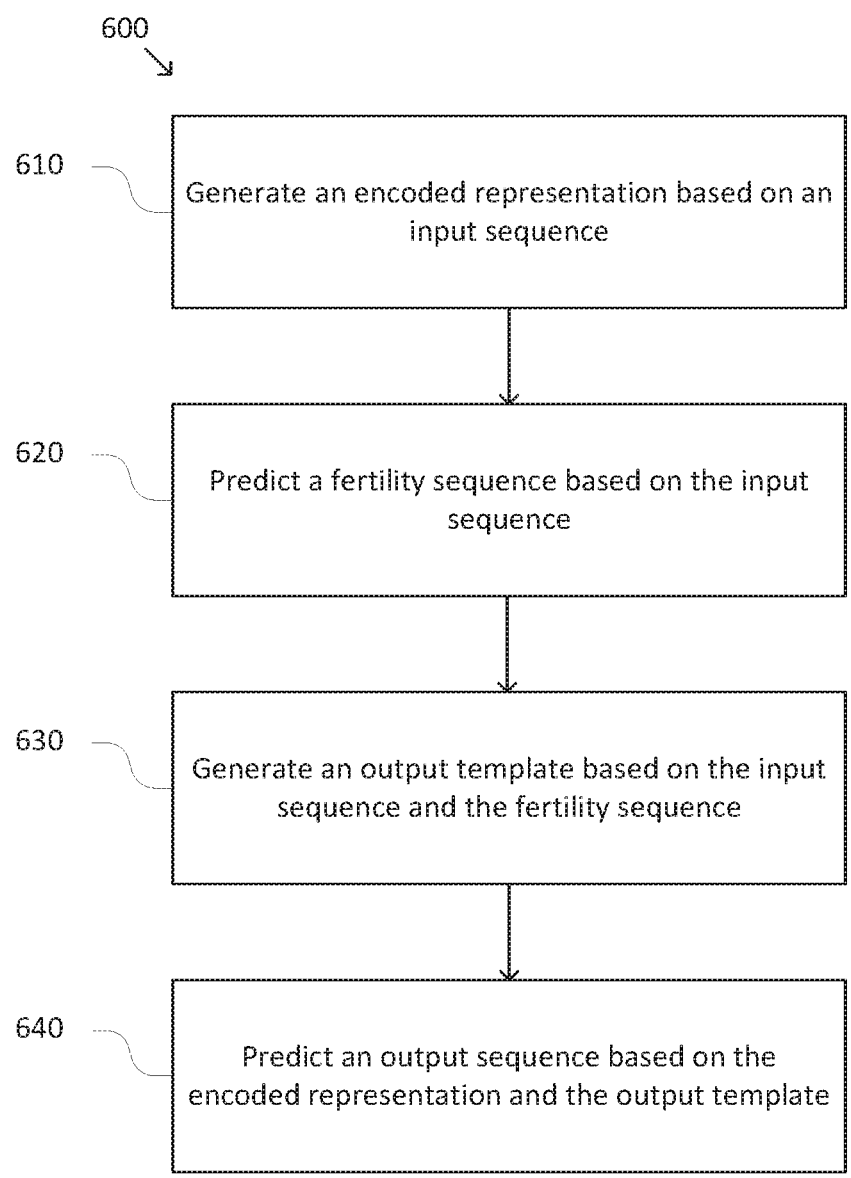
FIG. 6 is a simplified diagram of a method for sequence-to-sequence prediction according to some embodiments.

FIG. 6 is a simplified diagram of a method 600 for sequence-to-sequence prediction according to some embodiments. According to some embodiments consistent with FIGS. 1-5, method 600 may be performed using a processor, such as processor 120. In some embodiments, method 600 may be performed by evaluating a neural network model, such as models 140, 200b, 300, and/or 400. In some embodiments, the neural network model may include a plurality of model parameters learned according to a machine learning process.

At a process 610, an encoded representation is generated based on an input sequence. In some embodiments, the encoded representation may be generated by an encoder stage of the neural network model, such as encoder 230. In illustrative embodiments, the encoder stage may include one or more transformer encoder layers, such as transformer encoder layers 420a-t, arranged sequentially. In some embodiments the first and second sequence may correspond to text sequences, audio sequences, image sequences (e.g., video), and/or the like. In machine translation applications, the first sequence may correspond to a text sequence (e.g., a word, phrase, sentence, document, and/or the like) in a first language.

At a process 620, a fertility sequence is predicted based on the input sequence. In some embodiments, the fertility sequence may be predicted using a fertility module of the neural network model, such as fertility module 330. In some embodiments, each item in the fertility sequence may correspond to a fertility count and/or a probability distribution of fertility counts associated with a corresponding item in the input sequence. In some embodiments, the fertility sequence may be determined using a fertility module that includes a neural network classifier. In illustrative embodiments, the neural network classifier may include a feed-forward neural network having one or more layers, with a softmax classifier as the output layer. In some embodiments, a particular fertility count may be determined based on a probability distribution of fertility counts using an argmax approach, an average approach, a sampled search approach, and/or the like. In some embodiments, the fertility sequence may be determined based on a second encoded representation generated by the encoder (which may be the same as and/or different from the encoded representation generated at process 610). In illustrative embodiments, the second encoded representation may correspond to a layer encoded representation generated by a last transformer encoder layer among a plurality of sequentially arranged transformer encoder layers of the encoder.

At a process 630, an output template is generated based on the fertility sequence and the input sequence. In some embodiments, the output template may be generated by a template generator of the neural network model, such as template generator 340. In some embodiments, the output template may include f copies of each item in the input sequence, where f is the corresponding fertility count of the item given by the fertility sequence. In some embodiments, items in the input sequence with a fertility count of zero may not be included in the output template.

At a process 640, an output sequence is predicted based on the encoded representation and the output template. In some embodiments, the output sequence may be predicted using a decoder stage of the model, such as decoder 240. In some embodiments, the decoder stage may generate the output sequence in a parallel manner (e.g., using a plurality of parallel instances of the decoder stage), as discussed previously. In machine translation applications, the output sequence may correspond to a translated version of the first sequence in a second language.

In some embodiments, process 620 may include sampling a plurality of fertility sequences from a probability distribution using a sampled search approach. Consistent with such embodiments, processes 630 and/or 640 may be repeated for each of the plurality of sampled fertility sequences to predict a corresponding plurality of candidate output sequences. In some embodiments, processes 630 and/or 640 may be performed in parallel on each of the plurality of sampled fertility sequences, thereby mitigating the impact of the sampled search approach on the latency of the model. In some embodiments, the plurality of candidate output sequences generated at process 640 may be ranked and/or otherwise analyzed to select the best (e.g., most likely) output sequence.

Figure 7:
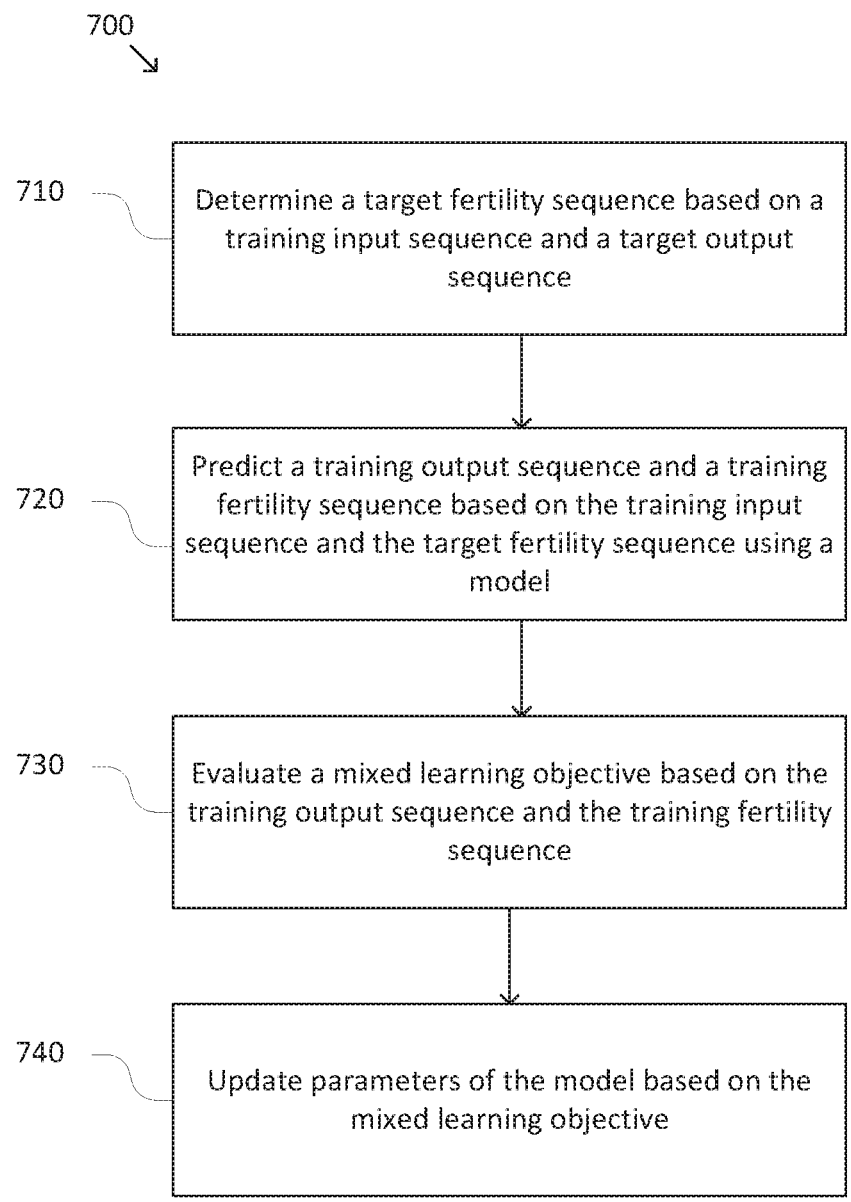
FIG. 7 is a simplified diagram of a method for training a neural network model according to some embodiments.

FIG. 7 is a simplified diagram of a method 700 for training a neural network model according to some embodiments. According to some embodiments consistent with FIGS. 1-6, method 700 may be used to train a neural network model, such as model 140, 200b, 300 and/or 400. During training, the model may be configured in a training configuration, such as training configuration 500. In some examples, method 700 may be performed iteratively over a large number of training examples to gradually train the neural network model.

At a process 710, a target fertility sequence is determined based on a training input sequence and a target output sequence. In some embodiments, the target fertility sequence may be generated using an aligner, such as aligner 540, based on the training input sequence and a target output sequence.

At a process 720, a training output sequence and a training fertility sequence are predicted based on the training input sequence and the target fertility sequence using the neural network model. In some embodiments, the output sequence may be predicted according to method 600, in which an encoder stage of the neural network model generates an encoded representation based on the training input sequence, a fertility module of the neural network model predicts the training fertility sequence based on the training input sequence, and a decoder stage of the neural network model predicts the training output sequence based on the encoded representation. However, rather than the decoder stage predicting the output sequence based on the training fertility sequence (e.g., the output of the fertility module), as in method 600, the decoder stage may predict the output sequence based on the target fertility sequence.

At a process 730, a mixed learning objective is evaluated based on the training output sequence and the training fertility sequence. In some embodiments, the mixed learning objective may correspond to mixed learning objective 520. In some embodiments, the mixed learning objective may include (1) an output learning objective that compares the training output sequence to a target output sequence (e.g., the ground truth sequence corresponding to the training input sequence) and (2) a fertility learning objective that compares the training fertility sequence to the target fertility sequence (e.g., the ground truth fertility sequence generated by the aligner).

At a process 740, the parameters of the neural network model are updated based on the learning objective. In some embodiments, the model parameters may be updated using an optimizer, such as optimizer 530. In some embodiments, the parameters may be updated by determining gradients of the mixed learning objective with respect to each of the model parameters and updating the parameters based on the gradients. For example, the gradients may be determined by back propagation.

FIGS. 8A-8B are simplified diagrams of an experimental evaluation of a non-autoregressive model according to some embodiments. The non-autoregressive model under evaluation generally corresponds to non-autoregressive transformer model 400, configured as depicted in FIG. 4. Multiple versions of the non-autoregressive transformer model are trained on the WMT 2014 English-to-German and German-to-English data sets, the WMT 2016 English-to-Romanian and Romanian-to-English data sets, and the IWSLT 2016 English-to-German data set, respectively.

FIG. 8A depicts a table 810 that compares the BLEU score accuracy and average latency of various models when trained and tested on the above-identified data sets: (1) a baseline non-autoregressive model 811 that does not include a fertility module; (2) a non-autoregressive model 812 that includes a fertility module; (3) a non-autoregressive model 813 that includes a fertility module and operates using a sampled search approach with 10 sampled fertility sequences per prediction; (4) a non-autoregressive model 814 that includes a fertility module and operates using a sampled search approach with 100 sampled fertility sequences per prediction; (5) an autoregressive model 815; and (6) an autoregressive model 816 that implements a beam search with 4 samples per prediction. As indicated, non-autoregressive models 812-814 achieve higher BLEU scores than baseline non-autoregressive model 811 for all data sets. Moreover, non-autoregressive models 812-814 achieve comparable BLEU scores to autoregressive models 815 and 816, while achieving a speedup (i.e., reduced average latency) by a factor of between 2.36 and 15.6. In particular, non-autoregressive model 814 achieves a higher BLEU score than autoregressive model 815 while reducing average latency by over 150 milliseconds.

FIG. 8B depicts a table 820 that illustrates the operation of a non-autoregressive model using a sampled search approach. The non-autoregressive model is trained on the WMT 2016 Romanian-to-English data set. The header row of table 820 corresponds to the input sequence, a Romanian phrase. The left hand column of table 820 corresponds to eight sampled output templates generated based on a fertility module of the non-autoregressive model using the sampled search approach. The right hand column of table 820 corresponds to the candidate output sequences (i.e., possible English translations of the Romanian phrase) predicted by a decoder of the non-autoregressive model based on the sampled output templates. As indicated, the sixth candidate output sequence from the top is identified as the most likely output sequence among the candidate output sequences and is therefore provided as the predicted output sequence of the non-autoregressive model.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications. Thus, the scope of the present application should be limited only by the following claims, and it is appropriate that the claims be construed broadly and in a manner consistent with the scope of the embodiments disclosed herein.

What is claimed is:

1. A method for sequence-to-sequence prediction using a neural network model, the neural network model including a plurality of model parameters learned according to a machine learning process, the method comprising:

generating an encoded representation based on an input sequence using an encoder of the neural network model;

predicting a fertility sequence based on the input sequence, each item of the fertility sequence including a fertility count associated with a corresponding item of the input sequence;

generating an output template based on the input sequence and the fertility sequence, wherein the output template includes f copies of each item in the input sequence, wherein f is the corresponding fertility count associated with the item of the input sequence; and predicting an output sequence based on the encoded representation and the output template using a decoder of the neural network model.

2. The method of claim 1, wherein the input sequence corresponds to a first text sequence in a first language, and the output sequence corresponds to a second text sequence in a second language.

3. The method of claim 2, wherein the fertility sequence is based on an alignment between the first text sequence and the second text sequence, the alignment being determined based on an alignment algorithm.

4. The method of claim 1, wherein the fertility sequence is predicted using a neural network classifier.

5. The method of claim 1, wherein the decoder predicts the output sequence in a parallel manner.

6. The method of claim 5, wherein each item of the output sequence is predicted using a different instance of the decoder, each different instance operating in parallel.

7. The method of claim 1, wherein:
the fertility sequence is one of a plurality of fertility sequences sampled from a probability distribution,
each of the plurality of fertility sequences is used to predict a candidate output sequence using a sampled search approach, forming a plurality of candidate output sequences, and
the output sequence is selected from among the plurality of candidate output sequences based on a ranking of the plurality of candidate output sequences.

8. The method of claim 7, wherein the plurality of candidate output sequences are predicted in a parallel manner.

9. The method of claim 1, wherein the encoder includes a plurality of encoder layers arranged sequentially, and wherein the fertility sequence is determined based on a layer encoded representation generated by a last encoder layer among the plurality of encoder layers.

10. The method of claim 1, wherein the machine learning process includes:
determining a target fertility sequence based on a training input sequence and a target output sequence;
predicting, using the neural network model, a training output sequence and a training fertility sequence based on the training input sequence and the target fertility sequence;
evaluating a mixed learning objective based on the training output sequence and the training fertility sequence; and
updating the plurality of model parameters based on the mixed learning objective.

11. A system for sequence-to-sequence prediction comprising:
an encoder stage that generates an encoded representation based on an input sequence;
a fertility module that predicts a fertility sequence based on the input sequence, each item of the fertility sequence including a fertility count associated with a corresponding item of the input sequence;
a template generator that generates an output template based on the input sequence and the fertility sequence, wherein the output template includes f copies of each item in the input sequence, where f is the corresponding fertility count associated with the item of the input sequence; and
a decoder stage that predicts an output sequence based on the encoded representation and the output template.

12. The system of claim 11, wherein the decoder stage corresponds to a non-autoregressive decoder that operates in a parallel manner.

13. The system of claim 11, wherein:
the fertility sequence is one of a plurality of fertility sequences sampled from a probability distribution by the fertility module,
each of the plurality of fertility sequences is used to predict a candidate output sequence using a sampled search approach, forming a plurality of candidate output sequences, and
the output sequence is selected from among the plurality of candidate output sequences based on a ranking of the plurality of candidate output sequences.

14. A non-transitory machine-readable medium having stored thereon a machine translation model, the machine translation model comprising:
an encoder stage including one or more transformer encoder layers arranged sequentially, the encoder stage generating an encoded representation based on an input representation of an input text sequence;
a decoder stage that predicts an output text sequence based on the encoded representation, the decoder stage including one or more transformer decoder layers arranged sequentially, each of the one or more transformer decoder layers receiving a respective layer encoded representation from a corresponding transformer encoder layer among the one or more transformer encoder layers;
a fertility module between the encoder stage and decoder stage that receives a last layer encoded representation from a last transformer encoder layer among the one or more transformer encoder layers and generates a fertility sequence, each item of the fertility sequence including a fertility count associated with a corresponding word of the input text sequence; and
a template generator between the fertility module and the decoder stage that generates an output template based on the fertility sequence and the input text sequence, the output template being received by the decoder stage to allow the decoder stage to predict the output text sequence in a non-autoregressive manner.

15. The non-transitory machine-readable medium of claim 14, wherein the fertility module includes a neural network classifier that generates a probability distribution for each fertility count in the fertility sequence.

16. The non-transitory machine-readable medium of claim 15, wherein the fertility module determines a given fertility count based on the probability distribution using at least one of an argmax approach, an average approach, or a sampled search approach.

17. The non-transitory machine-readable medium of claim 14, wherein the machine translation model further comprises an input stage that generates the input representation based on the input text sequence.

18. The non-transitory machine-readable medium of claim 14, wherein the machine translation model further comprises an embedding stage between the template generator and the decoder stage that generates an embedded representation based on the output template, the embedded representation being provided to the decoder stage.

* * * * *